United States Patent [19]

Bensadon

[11] Patent Number: 4,592,050
[45] Date of Patent: May 27, 1986

[54] APPARATUS AND METHOD FOR PROVIDING A TRANSPARENT INTERFACE ACROSS A SATELLITE COMMUNICATIONS LINK

[75] Inventor: Joseph M. Bensadon, Germantown, Md.

[73] Assignee: International Business Machines Corporation, Armonk, N.Y.

[21] Appl. No.: 594,656

[22] Filed: Mar. 29, 1984

[51] Int. Cl.⁴ .............................. H04J 3/06; H04J 3/00; H04L 7/00; H03K 1/17

[52] U.S. Cl. ................................... 370/103; 370/104; 370/100; 375/107; 375/109

[58] Field of Search ............... 370/100, 104, 103, 102; 375/107, 109

[56] References Cited

U.S. PATENT DOCUMENTS

| | | | |
|---|---|---|---|
| 4,005,266 | 1/1977 | Lehr et al. ............................ | 375/107 |
| 4,144,414 | 3/1979 | Nicholas ............................... | 375/107 |
| 4,253,181 | 2/1981 | Watten ................................. | 370/103 |
| 4,494,211 | 1/1985 | Schwartz ............................. | 375/107 |

Primary Examiner—Douglas W. Olms
Assistant Examiner—Wellington Chin
Attorney, Agent, or Firm—John E. Hoel

[57] ABSTRACT

A mechanism is disclosed for a time division multiple access communications network, to enable the synchronizing of traffic messages between a transmitting and a receiving node. A transmit clock mechanism at the transmitting node includes a slip counter for accumulating a slip count value during consecutive intervals of transmission. The slip count value is transmitted along with the traffic messages over the communications link to the receiving node. A slip count detector is located at the receiving node, for receiving the slip count value and adjusting the receive clock at the receiving node in response to the slip count value. In this manner, a timing slip adjustment which has been made at the transmitting node will have a corresponding timing slip adjustment imposed at the receiving node so as to maintain the proper synchronization between the sending and receiving stations during a time division multiple access communications session.

1 Claim, 9 Drawing Figures

FIG. 1

FIG. 2
TRANSMIT

FIG. 4
CONTROL CHANNEL TIMING

FIG. 6
Sc=Sn PROOF

APPARATUS AND METHOD FOR PROVIDING A TRANSPARENT INTERFACE ACROSS A SATELLITE COMMUNICATIONS LINK

FIELD OF THE INVENTION

The invention disclosed broadly relates to multiplexed digital communications and more particularly relates to synchronization techniques for time domain multiple access communications.

BACKGROUND OF THE INVENTION

The problem being addressed by the invention is how to interrupt the data path in a terrestrial communications network by inserting a satellite communications link, without disturbing the timing and control signaling between the sending portion and the receiving portion of the terrestrial network. Typical high speed data communications networks require precise timing in order to enable the multiplexing and concentration of many transmitting sources at the transmitting end and the demultiplexing and time expansion of the messages received over the network at the receiving end. A further problem arises in connection with multiplexed and time concentrated data communications when it is desired to maintain duplex communications links, wherein each respective end of the communications link can simultaneously carry on transmission and receiving operations. In order to maximize the efficiency of the communications network, the transmitted messages and received messages for a particular member of the communications network should occur synchronously at the multiplexing and demultiplexing sites, in order to enable a single switching operation to convey both the transmitted and the received messages in the duplex mode. A corollary problem involved is that the satellite communications network, although synchronous within itself, is not necessarily synchronous with the terrestrial network. Some means must be provided to compensate for moments of data traffic surplus or moments of data traffic deficiency for messages arriving at the interface between the terrestrial network and the satellite link, so that similar compensatory steps can be carried out at the opposite end of the satellite link, thereby enabling the timing environment of the transmitting portion of the terrestrial network to be accurately reconstructed at the receiving portion of the terrestrial network.

An example of a time domain multiple access (TDMA) satellite communications network within which the invention disclosed herein can find application, is described in U.S. Pat. No. 4,320,504 to Alvarez, et al entitled "Mechanism for Synchronization of Data Ports in TDMA Communication," which is assigned to the IBM Corporation. A typical communications protocol which can be used to connect the satellite network to a terrestrial data communications network is the standard X.24 interface as defined by the Consultative Committee for International Telephone and Telegraph (CCITT) recommendation X.24, as amended in Geneva, 1976. It is desirable to be able to characterize such an interface from the point of entry into a satellite communications network to the point of exit, so as to render the characteristics of the satellite network transparent to the users of the terrestrial network connected to it.

OBJECTS OF THE INVENTION

It is therefore an object of the invention to provide an improved communications technique for rendering the characteristics of a communications link transparent to users.

It is another object of the invention to provide an improved time domain multiple access communications network which is transparent to users of standard communications interfaces.

It is still a further object of the invention to provide an improved time domain multiple access communications network wherein synchronization of operations between the transmitting station and the receiving station can be more reliably maintained.

SUMMARY OF THE INVENTION

These and other objects, features and advantages of the invention are accomplished by the apparatus and method disclosed herein. A mechanism is disclosed for a time division multiple access communications network, to enable the synchronizing of traffic messages between a transmitting and a receiving node. A transmit clock mechanism at the transmitting node includes a slip counter for accumulating a slip count value during consecutive intervals of transmission. The slip count value is transmitted along with the traffic messages over the communications link to the receiving node. A slip count detector is located at the receiving node, for receiving the slip count value and adjusting the receive clock at the receiving node in response to the slip count value. In this manner, a timing slip adjustment which has been made at the transmitting node will have a corresponding timing slip adjustment imposed at the receiving node so as to maintain the proper synchronization between the sending and receiving stations during a time division multiple access communications session.

DESCRIPTION OF THE FIGURES

These and other objects, features and advantages of the invention will be more fully appreciated with reference to the accompanying figures.

FIG. 3 (FIGS. 3A, 3B, 3C) is a functional block diagram of the receive portion of a station in a satellite communications network.

DISCUSSION OF THE PREFERRED EMBODIMENT

In the implementation of data communications networks composed of a ground link as well as a satellite link, one is often faced with the task of maintaining the same transmission format for the digital interface from the point of entry into the satellite network to its point of exit, thus effectively rendering the satellite network transparent to the user (except for the delays inherent in the satellite path). The invention disclosed herein can be used in a satellite communications network employing satellite communications controllers (SCC) such as is disclosed in U.S. Pat. No. 4,320,504, assigned to the IBM Corporation. As an example of an application of the invention disclosed herein, an X.24 interface can be completely characterized from the point of entry into the satellite network to the point of exit. In this manner, the satellite network is made completely transparent to the user. The invention disclosed herein is applicable to any digital interface.

Figure 1:
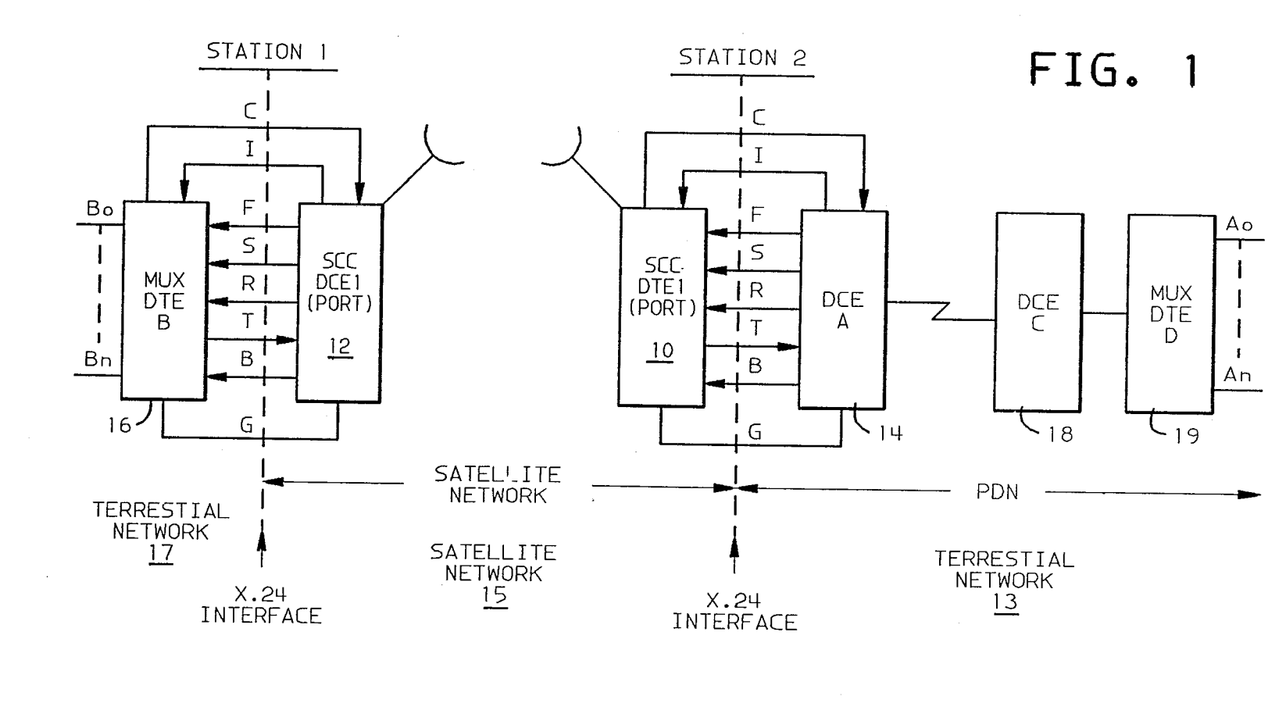
FIG. 1 is an overall functional block diagram of two stations in a satellite communications network.

FIG. 1 is a functional block diagram of a satellite communications network 15 which connects a first terrestrial network 13 to a second terrestrial network 17. A first station 1 includes a satellite communications controller (SCC) 12 which is connected to a terrestrial, data transmission equipment (DTE) multiplexer 16 by means of an X.24 interface. A second station 2 has a satellite communications controller (SCC) 10 connected through an X.24 interface to a terrestrial, data communications equipment (DCE) 14. The DCE 14 can be connected by land lines, for example to a second terrestrial DCE 18 which, in turn, can be connected to another terrestrial multiplexer, the DTE 19. The problem being addressed by the invention disclosed herein, is how to maintain the same timing characteristics and format characteristics at the X.24 interface to the DTE 16 at the station 1, which existed at the X.24 interface of the DCE 14 at station 2. The invention disclosed herein accomplishes this purpose by eliminating timing slip between the ground network and the satellite network at station 2 of FIG. 1. The invention also enables the transmission of clocking information from station 2 to station 1 so that the clock S at station 1 will be synchronous with the clock S at station 2. The invention also enables the generation of a framing character (F bit) which switches on the byte boundaries. The framing character F is generated at station 1 in the same bit relationship to the data in station 1 as occurred when the framing character F entered in the satellite network at station 2. This enables the synchronization of data transmitted from station 1 to station 2 with respect to the framing character F. Furthermore, the invention enables the transmission of the control bit C or the indication bit I in a real time relationship with respect to the data stream as it is being transmitted from station 2 to station 1, as is shown in FIG. 1.

The following discussion demonstrates how the timing slip error is eliminated in transmitting digital information from the terrestrial DCE 14 at station 2, over the satellite network to the DTE 16 at station 1. The DCE 18 in the terrestrial portion of the communications link, transmits data to the DCE 14 at station 2 with a particular frequency. The DCE 14 at station 2 transfers the clocking characteristic of the data input to the DCE 14 from the DCE 18 to the SCC 10 at station 2 by means of the S line. Since the SCC 10 uses its own clock to read data from the ports connected to the DCE 14, a timing slip occurs between the rate at which data is being applied to the ports of the SCC 10 and the rate at which data is being transmitted from the SCC 10 through the satellite link to station 1.

Figure 2:
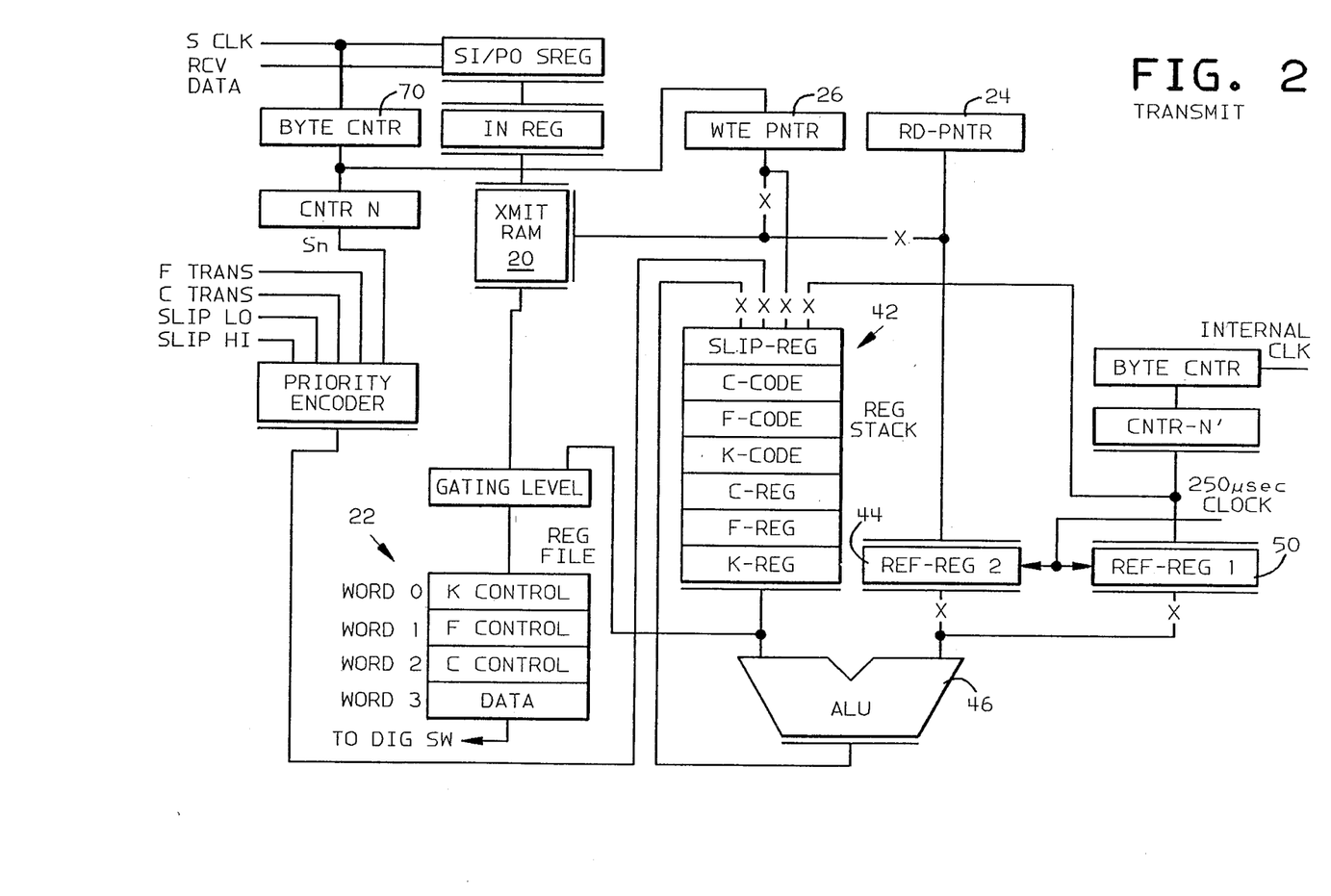
FIG. 2 is a functional block diagram of the transmit portion of a station in the network.

Referring to FIG. 2, which illustrates the transmission portion of the invention which resides in the data port of the SCC 10, the timing slip referred to above occurs between the transmit RAM 20, read pointer 24 and write pointer 26. The slip is defined as the loss of synchronization between the incoming data to the SCC 10 data port and the data being transmitted to the satellite network. Whenever the satellite communications controller (SCC) 10 is referred to herein, the details of the structure and operation can be found in U.S. Pat. No. 4,320,504, assigned to the IBM Corporation. In accordance with the invention, when a timing slip occurs, a code word indicating whether the timing slip is positive or negative, is transmitted from station 2 to station 1. For example, when a slip of eight bit times between the S clock input to the data port of SCC 10 occurs, with respect to the timing of the data transmitted from the SCC to the satellite link, a code word indicating whether the slip is positive or negative, is loaded at word 0 in the register file 22 at the 250 microsecond clock time of the SCC clock. FIG. 2B shows the data port transmit logic with the register file 22, and Table 1 herein shows the code words which are used to indicate to station 1, the kind of slip which has occurred.

Figures 3, 3A:
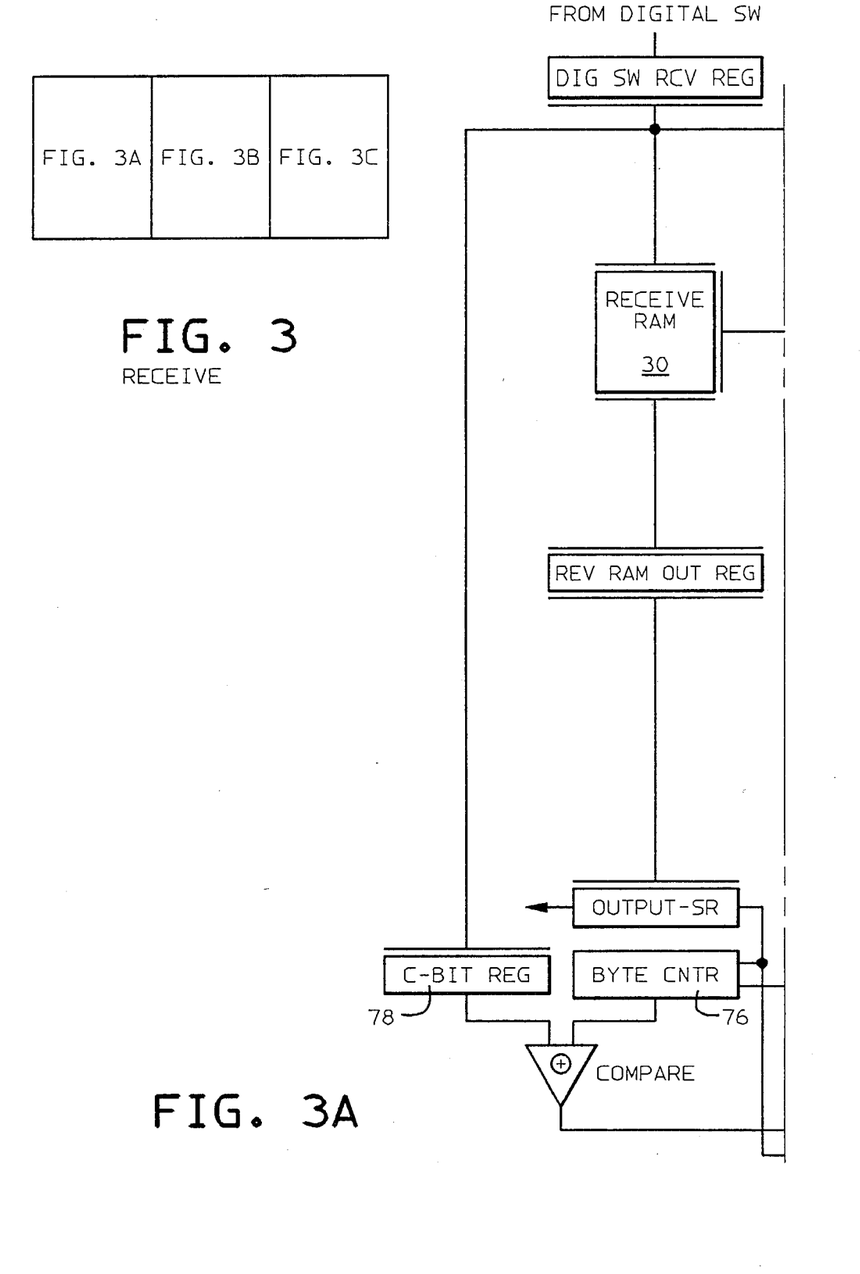
Figure 3B:
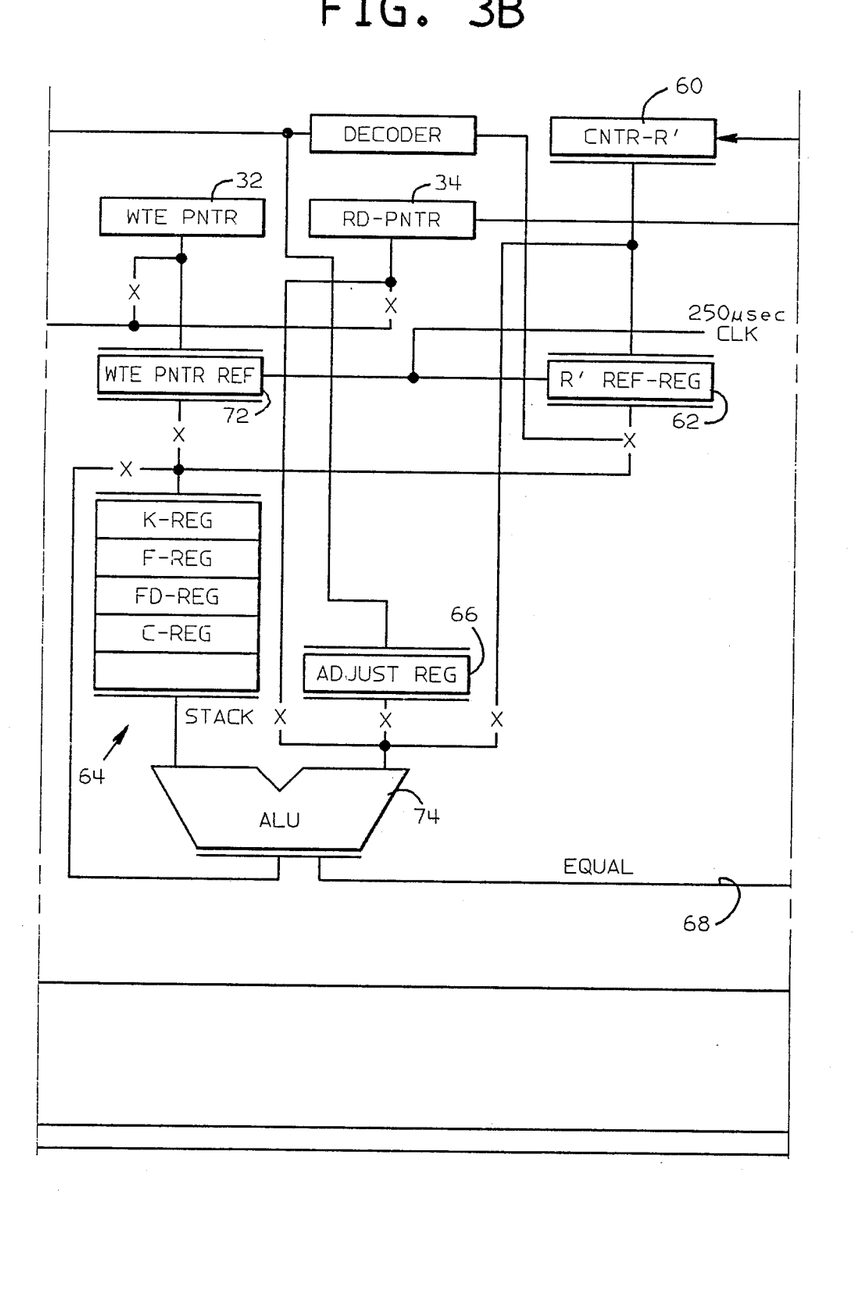
Figure 3C:
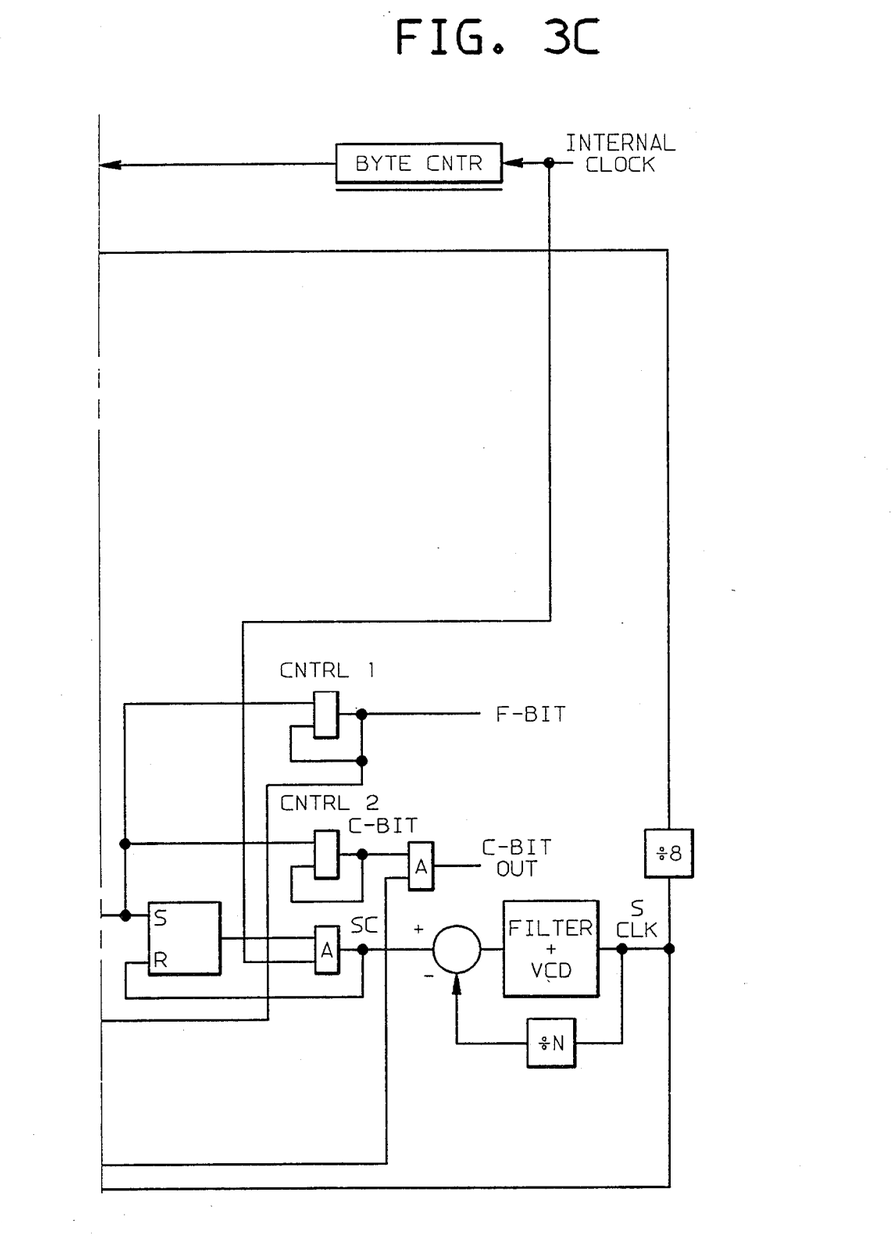
Figure 4:
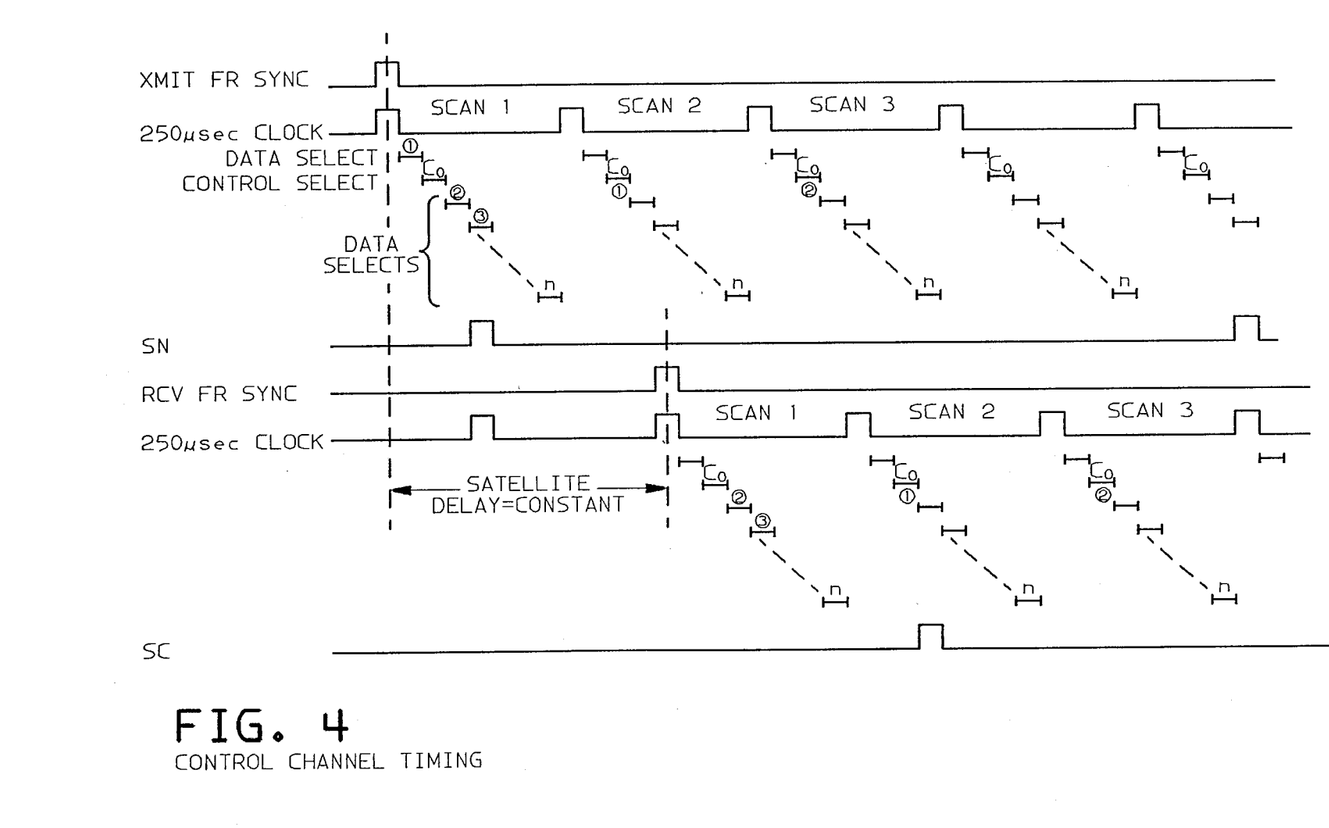
FIG. 4 is a control channel timing diagram.

FIG. 4 illustrates the channel control timing, in accordance with the invention. The SCC 10, which is described in U.S. Pat. No. 4,320,504, has data ports which are selected at rates which are N multiples of 32 Kbps. There are 60 scans per 15 millisecond frame and there are N selects per scan. In the invention disclosed herein, FIG. 4 shows that each data port in the SCC 10 is selected at a rate which provides an additional 32 Kbps channel per TDMA frame, which is used for the transmission of the control information indicating the degree of slip. Thus, a 2048 Kbps port in the SCC 10 will require 2048 plus 32 Kbps of bandwidth. As can be seen in FIG. 4, at the C0 select time of scan 1, the appropriate code word is transmitted to the digital switch in the SCC 10 (see U.S. Pat. No. 4,320,504 for a description of the digital switch). FIG. 3 shows that an additional select per scan, that is the select C0, has been allocated to the data port for the transmission of control information. This additional select per scan represents the addition of one channel space capacity to the port for the selective transmission of data and controls.

If the timing slip is positive (that is the external clock is faster than the port clock so that more data is being received by the SCC 10 from the DCE 14 than is being transmitted from the SCC 10 to the satellite link), then the next C0 select of FIG. 4 (the C0 of scan 2) has a byte of data read from the transmit RAM 20 of FIG. 2. That byte of data is loaded into the register file 22 at word 0 and then the read pointer 24 is correspondingly incremented. Note that since C0 selects are not normally used to transmit data, this is the equivalent of holding 32 Kbps of excess bandwidth in reserve until it is needed. When the C0 selects are not used to transmit information, space capacity need not be consumed and the data activity compression (DAC) feature of the SCC 10 can be used to save that unused space capacity (see U.S. Pat. No. 4,320,504 for a description of the data activity compression feature).

Alternately, if the timing slip is negative (that is the external clock is slower than the port clock so that less data is being received by the SCC 10 from DCE 14 than is being transmitted from the SCC 10 to the satellite link), then on the following data select (select 2, scan 1 of FIG. 4), no data is read from the transmit RAM 20 and the read pointer 24 is not incremented. This effectively slows down the RAM 20 read rate so as to match the write rate. The C0 select of scan 1 will transmit a negative slip code as can be seen in Table 1.

Turning now to the receive logic of the invention disclosed herein, which is shown in FIG. 3, this receiving logic is located in the data port at the receiving SCC 12 at station 1. The receive logic of FIG. 3 continuously monitors the state of the C0 byte received from the digital switch within the SCC 12 (see U.S. Pat. No. 4,320,504 for a description of the digital switch interaction with the data port in the SCC). If no information was transmitted in the C0 channel from the SCC 10 at station 2 to the SCC 12 at station 1, no action is taken by the receive logic in FIG. 2B. If a positive slip indication is received, then in the following C0 select, data is loaded in the receive RAM 30 and the write pointer 32 is incremented.

If a negative slip indication is received by the receive logic of FIG. 3, then on the following data select (data select 2, receive scan 1 of FIG. 4), no data is written in a receive RAM 30 and the write pointer 32 is not incremented.

Since the receive RAM 30 has its write pointer 32 now being incremented at a rate greater (that is a positive slip) or smaller (that is a negative slip) than the port clock rate at station 1, the clock which drives the read pointer 32 has to be correspondingly adjusted so that a timing slip condition in the receive RAM 30 will not occur. Note, that the scans in FIG. 4 have been numbered to simplify this explanation. The slip however, can occur on any scan with respect to the frame synchronization pulses.

The clock characterization function of the invention will now be described. Referring now to the transmit logic of FIG. 2, the S clock received by the SCC 10 from the DCE 14 at station 2, is divided down in its frequency in the counter N of FIG. 2 to produce a 1 kHz signal SN. In addition, the internal clock is divided down in counter N' to produce a reference value. Thus, whenever a pulse SN occurs, the value of the modulo N' counter is stored in the K register of the register stack 42.

At the 250 microsecond clock time following the occurrence of the SN pulse, a code word is stored in the register file 22 at word 0, indicating that a SN clock transition has occurred. In addition, the difference between the value in the K register and the reference register 50 is calculated in the arithmetic logic unit (ALU) 46 and stored back in the K register. Note that reference register 50 is updated every 250 microseconds with the value in counter N'. The updating occurs by means of the 250 microsecond clock CLK. Counter N' is of the same modulo as counter N and the internal clock which drives it is of the same nominal frequency as the external S clock. However, the clock which drives the N' counter is synchronous with the network clock of the SCC 10, and therefore it is synchronous with the 250 microsecond clock.

In the following C0 select (scan 2 of FIG. 4), the contents of the register file word 0 are read by the digital switch in the SCC 10 and that information is transmitted via the satellite link to the SCC 12 at station 1. At the following 250 microsecond clock, the contents of the K register in the transmit logic circuit of FIG. 2, is loaded into the register file word 0.

In the following C0 select (scan 3 of FIG. 4), the word 0 location is read again by the digital switch in the transmit logic of FIG. 2, and that value is transmitted via the satellite link to the destination SCC 12 at station 1. The transmitted value relates the time of occurrence of SN with the time of occurrence of the 250 microsecond clock. What has effectively been done is to determine what the difference is between the N and the N' counter values with respect to the 250 microsecond clock boundaries following the occurrence of SN. SN was chosen as a one kHz signal so as to save space capacity. A higher frequency of SN can be used, however it will consume more bandwidth.

Referring to the receive logic of FIG. 3, a reference counter R' 60 is loaded into the R' reference register 62 every 250 microseconds. The R' counter 60 is incremented by an internal clock which has the same frequency as the internal clock in the transmit logic at station 2, shown in FIG. 2, because the satellite communications network is synchronous. In addition, the modulo value of the R' counter 60 is equal to the modulo value of the N' counter in the transmit logic FIG. 2. Since the satellite communications network is synchronous, the 250 microsecond clock at the receiving SCC 12 is of the same frequency as the 250 microsecond clock at the transmitting SCC 10. Therefore, the code word transmitted in scan 2 of the transmit frame, as is shown in FIG. 4, is received at station 1 in the corresponding C0 slot of scan 2 of the receive frame, as is seen in FIG. 4.

The first code word received at station 1 indicates the occurrence of the SN pulse, and it causes the value in the reference register 62 to be stored in the K register of the stack 64.

The next C0 select of FIG. 4, contains the adjustment difference which is loaded into the adjust register 66 in FIG. 3. This adjustment difference is then subtracted from the value in the K register of the stack 64. The result is the target address, which is loaded back into the K register of the stack 64.

When the R' counter 60 has the value which equals the target address stored in the K register of stack 64, a pulse SC is generated on line 68 at the bit time following the compare. SC will be of the same frequency as SN which is generated by the transmit logic in FIG. 2.

Figure 6:
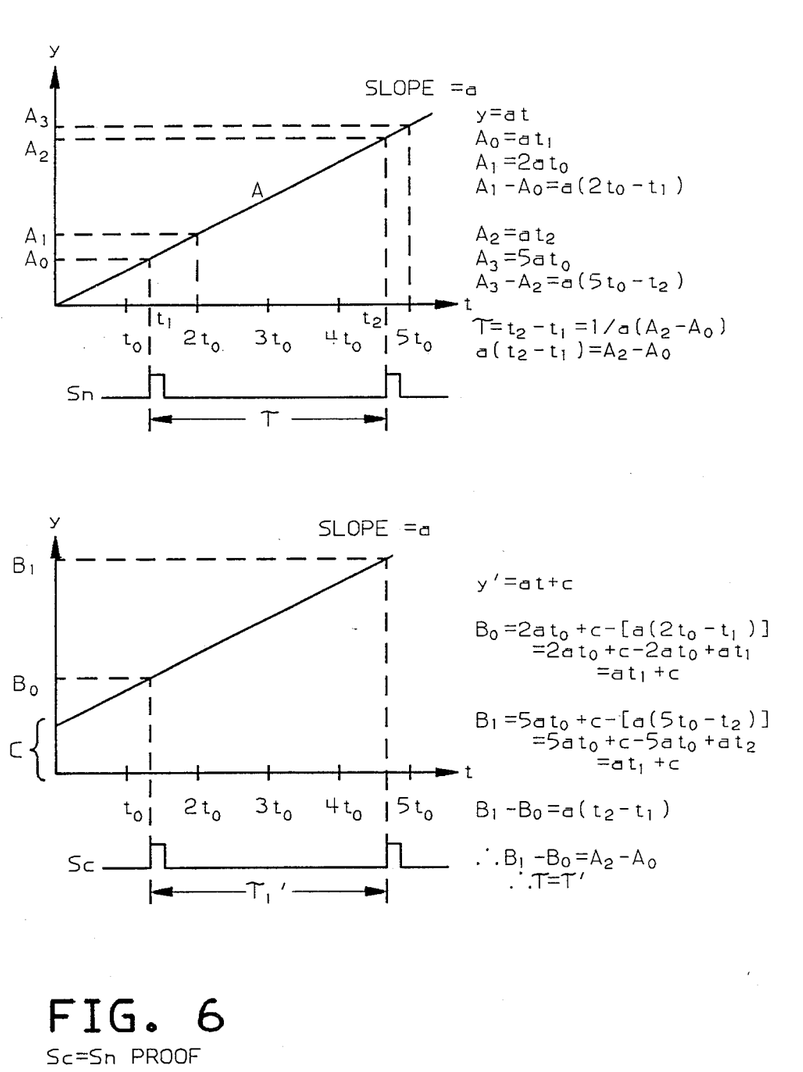
FIG. 6 are graphs illustrating the operation of the invention.

FIG. 6 is a graphical representation of the operation of the invention, showing in particular the frequency of occurrence of SN can be duplicated at the receiving station 1 in a synchronous network such as the satellite communications network, in accordance with the invention. The upper graph represents the counter N' in FIG. 2, which is incremented at a constant rate producing the slope A. The lower graph in FIG. 6 represents the counter R' at the receiving station 1, which is incremented at the same rate as is the counter N' at the transmitting station 2, although it is offset in its origin from the upper curve in FIG. 6, by a constant delay C which is characteristic of the inherent delay in the satellite communications network. As can be seen in FIG. 6, the period of SC equals the period of SN.

The SC signal generated in the receive logic of FIG. 3 is used to control a conventional phase locked loop having the same nominal frequency as the S clock applied by the DCE 14 to the SCC 10 at station 2. In accordance with the invention, this mechanism prevents timing slips of the digital information at the output port of the SCC 12 at the receiving station 1. Note that the timing jitter in SC is minimized since no jitter is introduced into the satellite communications network where, characteristically, high precision clocks are maintained.

The technique for transmitting framing characters will now be described. Framing characters are used in many data transmission protocols to synchronize the receiver and to delineate information units which are to be multiplexed among several receiving units. The DCE 14 in station 2 of FIG. 1 will transfer framing bits over the F line to the SCC 10. When the SCC 10 detects an F bit (framing bit) transition, the following sequence of events takes place.

Referring to the transmit logic of FIG. 2, when the F bit occurs, the value of the write pointer 26, which contains the address in the transmit RAM 20 where data is to be written, is stored in the F register of the register stack 42. This address is the address which exists at the time of the F bit transition.

The byte counter 70 is then reset so the data stored in the transmit RAM 20 will be serialized on byte boundaries. It is assumed that in conventional data transmission protocols such as the X.24 protocol, the F bit transition will occur on byte boundaries.

Figure 5:
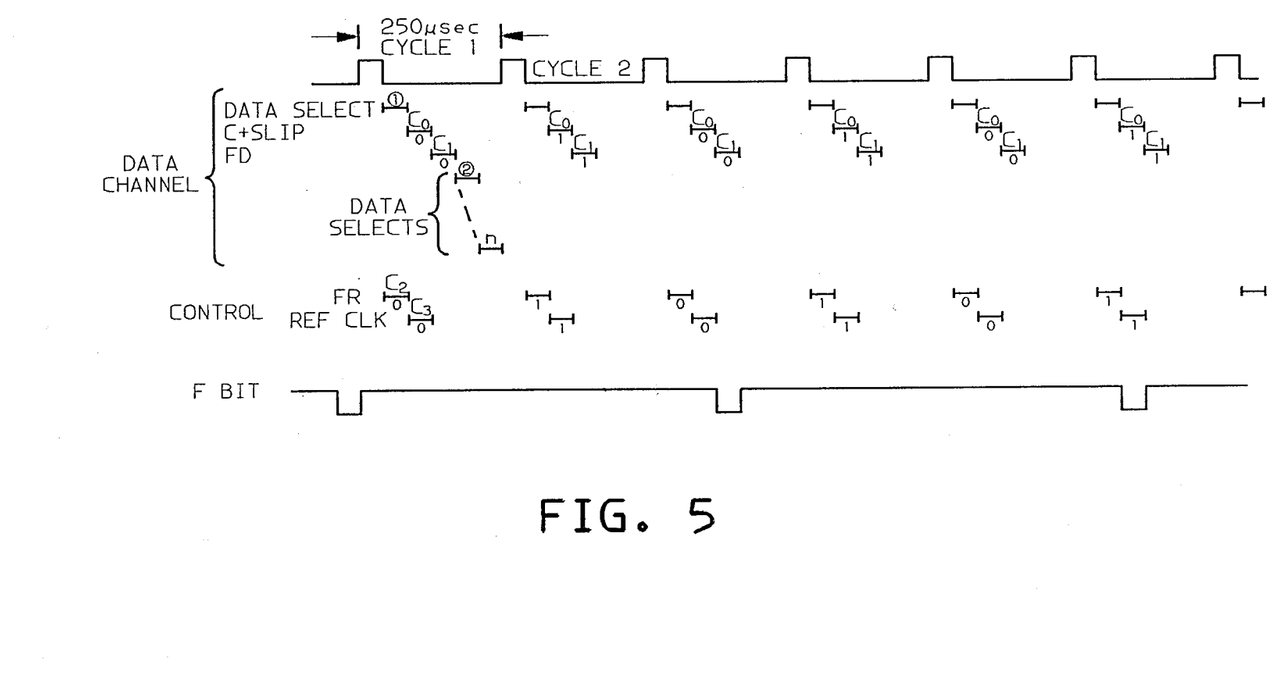
FIG. 5 is a data channel timing diagram.

At the 250 microsecond clock time (that time being a universal time in the satellite communications network), cycle 1 shown in FIG. 5 has a code word stored in the register file 22 at word 1, indicating that an F bit transition has occurred. Also, the difference between the read pointer 24 and the value stored in the F register of the register stack 42, is calculated in the arithmetic logic unit 46 and that difference is stored back in the F register of the register stack 42.

At the C1 select time cycle 1 of FIG. 5, the code word in the register file 22 word 1 is read by the digital switch in the SCC 10 at station 2 and is transmitted via the satellite link to the destination SCC 12 at station 1.

At the 250 microsecond clock time cycle 2 of FIG. 5, the value in the F register of the register stack 42 in FIG. 2 is stored in the register file word 1. (This is the difference value previously calculated by the ALU 46.)

At the C1 select time of cycle 2 in FIG. 5, the word 1 value in the register file 22 is read by the digital switch in the SCC 10 and is transmitted to the destination SCC 12. Note, that the transmission logic in FIG. 2 effectively determines where the F bit transition occurred with respect to the read pointer 24 at the 250 microsecond time (which is universal time in the SCC satellite communications network).

The operation of the invention for receiving the F bit will now be described. As is seen in FIG. 1, the receiving SCC 12 monitors the state of the bytes received from its digital switch (see U.S. Pat. No. 4,320,504) every C1 select slot, if the code word received by the SCC 12 from the satellite network, indicates that an F bit transition has taken place.

In the receive logic of FIG. 3, a write pointer value is stored in the reference register 72 at every 250 microsecond clock time. This write pointer value in the reference register 72 is used to calculate the target byte, that is the byte of data where the F bit switched at the source port of the SCC 10. This value is loaded into the F register portion of the register stack 64.

At the following C1 select, as is shown in FIG. 5, the byte of data received from the digital switch in the SCC 12, is stored in the adjust register 66 and added to the value in the F register of the register stack 64. This computed value indicates the address of the target byte. The target byte is then loaded back into the F register in the register stack 64.

During the data selects of the port in the receiving SCC 12 (see U.S. Pat. No. 4,320,504), following the C1 select, the target byte is compared to the read pointer value 34, as is seen in FIG. 3. The compare done by the arithmetic logic unit (ALU) 74 causes the F bit line output from the SCC 12 to the DTE 16 at station 1, to switch on for one clock cycle.

In accordance with the invention, the F bit can be echoed back from the SCC 12 at station 1 to the SCC 10 at station 2 in the following manner, in order to enable the alignment of the multiplexed data transmitted in duplex mode back from the SCC 12 to the SCC 10. Thus, the DTE 16 can now align the multiplexed data it transmits to the SCC 12 on F bit boundaries.

The SCC 12 transmits the F bit that was derived as described above, to the SCC 10 over the satellite link. The F bit derived in the SCC 12 is effectively echoed back to the originating port of the SCC 10 in synchronism with the data transmitted back from station 1 to station 2.

Conventional data transmission protocols will allow a duplex mode of communication, and in the duplex mode, it is typical that the framing bit (F bit) in the transmit data stream occurs simultaneously as the F bit in the receiving data stream. The F bit will occur at the same time in both directions. The following discussion illustrates how the invention disclosed herein insures that F bit transitions occur synchronously in both directions for duplex communication, over a satellite link. Typically this would pose a problem in the prior art because of the asynchronous timing of the satellite communications network and the extensive propagation delay of signals in the satellite network.

It is understood, of course, that each SCC 10 and SCC 12 contain identical circuitry, with the SCC 10, for example, containing receive logic of FIG. 3 in its data port along with the transmit logic of FIG. 2. In discussing the duplex mode of communication, the discussion will center upon the SCC 10 as receiving return information flow from the SCC 12 at station 1.

The receive logic in FIG. 3, located at the SCC 10 will compute the target byte as was described above and store that value in the FD register in register stack 64 of FIG. 3. A valid bit is then turned on to indicate that synchronization with the F bit from the DCE 14 to the SCC 10, is required.

When the F bit from the DCE 14 to the SCC 10 switches on at the interface at station 2, the value of the read pointer 34 in FIG. 3 at that time is subtracted from the target address in register FD in stack 64, which address was computed as previously described, and that difference is stored in the FD register in stack 64. Recall that the target byte indicates where the echoed F bit from the satellite communications network occurred. The value now stored at the register FD in stack 64 is the offset between the echoed F bit from the satellite network and the terrestrial network F bit from the DCE 14.

The object now is to move the read pointer when the next terrestrial F bit occurs, to the target address. In this manner, data associated with the echoed F bit will be coincident with data associated with the terrestrial F bit.

In FIG. 3, when the F bit from the DCE 14 to the SCC 10 switches on again, the difference stored in the target FD register stack 64 is added by the arithmetic logic unit 74 to the value in the read pointer 34. The read pointer 34 in FIG. 3, thus points to the target byte at the time the F bit from the DCE 14 to the SCC 10 switches on. The data originating at the DTE 16 at station 1 is thus aligned with the F bit at the DCE 14 at station 2.

Note that the rate of occurrence of the target byte is identical to the rate of occurrence of the F bit. They occur every N bytes in accordance with the frame structure of the terrestrial network. Once the target byte is synchronized to the F bit from the terrestrial network, synchronization will be maintained unless one or more bytes are lost due to a timing slip between the SCC clock and the terrestrial clock. The timing slip compensation method previously described will prevent this circumstance from happening, in accordance with the invention.

Thus, it can be seen that the satellite communications network will be transparent to the terrestrial networks. Timing slips are prevented between the terrestrial networks communicating over the satellite link and the transmitted data stream and received data stream in the duplex mode of communication will be synchronized as is required for conventional terrestrial data transmission protocols.

In the X.24 data transmission protocol, and in other protocols, additional control bits must be transmitted. For example, in the X.24 protocol, the transmission of the control (C bit) or the indication (I bit) which are present at the X.24 interface will be identical to the method described previously for the F bit, except that no C bit echo transmission will be necessary. In addition, since the C bit does not necessarily switch on byte boundaries, an additional three bit field indicating where in the byte the C bit will be switched, must be transmitted. This information is transmitted in the first control byte transmitted with the C0 select as is shown in FIG. 5. When the first C0 byte is decoded in the receive logic of FIG. 3, the three bit field is located in the C register 78. When the byte counter 76 has a value which equals the value in the C register 78, the C bit is switched. Note that this will occur after the read pointer 34 has reached the target C byte, as explained previously for the F bit. A C target is computed in a manner similar to the computation of the F target, as previously described. The C bit information is then transmitted only when there is a change in the state of the bit at the X.24 interface at station 2. This reduces the bandwidth requirements and enables the sharing of the C0 channel with the transmission of the slip information, as previously described. The coding of the control byte is described in Table 1.

TABLE 1

| Control Codes | | |
|---|---|---|
| C0 | | |
| Bit 0 | Control ID | 0 |
| Bit 1 | Control ID | 1 |
| Bit 2 | Control ID | 2 |
| Bit 3 | C Bit Address | 0 |
| Bit 4 | C Bit Address | 1 |
| Bit 5 | C Bit Address | 2 |
| Bit 6 | Unused | |
| Bit 7 | Unused | |

| | | Control Code | |
|---|---|---|---|
| ID 0 | ID 1 | ID 2 | |
| 0 | 0 | 0 | No Action |
| 0 | 0 | 1 | C Change |
| 0 | 1 | 0 | F Change |
| 0 | 1 | 1 | K Clock |
| 1 | 0 | 1 | + Slip |
| 1 | 1 | 0 | − Slip |
| 1 | 0 | 0 | C Bit Change and + Slip |
| 1 | 1 | 1 | C Bit Change and − Slip |

The concept of the invention disclosed above can be expanded to include having a first transmit logic and first receive logic in a first port at the SCC 10 and a second transmit logic and a second receive logic at a second port at the SCC 10. Correspondingly, a third transmit logic and third receive logic can be located at a third port at the SCC 12 and a fourth transmit logic and fourth receive logic can be present in a fourth port at the SCC 12. Then, at the SCC 10, a first terrestrial trunk line can be connected to the first port having a first characteristic timing and the first port can communicate via the satellite network to the third port which is connected to a third trunk at station 1 having the same characteristic timing. A second trunk can be connected to the second port at station 2 having a characteristic timing which is different from the characteristic timing of the first trunk connected to the first port at station 2. A fourth trunk can be connected to the fourth port at station 1 which has the same characteristic timing as the second trunk at station 2 but with a different timing characteristic from that associated with the third trunk at station 1. In this manner, two asynchronous communications trunks can be supported by the same satellite communications network, by means of the invention disclosed herein.

Although a specific embodiment of the invention has been disclosed, it will be understood by those of skill in the art that the foregoing and other changes in form and details may be made therein without departing from the spirit and the scope of the invention.

I claim:

1. In an integrated communications network including a transmitting terrestrial portion for transmitting messages delineated by framing characters and having a first bit timing cycle, a satellite communications portion with a first ground station serially connected to said transmitting terrestrial portion, for receiving said messages from said transmitting terrestrial portion and retransmitting them with a universal timing cycle characterized by a periodic universal clock pulse over a satellite link to a second ground station and a receiving terrestrial portion serially connected to said second ground station of said satellite communications portion, for receiving said messages from said second ground station and retransmitting them, a system for synchronizing said receiving terrestrial portion with said transmitting terrestrial portion so that said messages transmitted by said receiving terrestrial portion are delineated by said framing characters and have said first bit timing cycle, comprising:

a first counter in said first ground station, connected to said transmitting terrestrial portion, for generating a first periodic signal characterizing said first bit timing cycle;

a second counter in said first ground station, connected to a clock source for said universal timing cycle, for accumulating clock pulses from said universal timing cycle;

a difference means connected between said first counter and said second counter and having control input connected to a source of said universal clock pulse, for outputting a difference value between the accumulated count in said second counter at the instant of occurrence of said first periodic signal, and the accumulated count in said second counter at the instant of occurrence of said universal clock pulse, said difference value characterizing the degree of bit synchronization between said transmitting terrestrial portion and said satellite communication portion;

a transmitting means connected to said transmitting terrestrial portion and including a transmit memory, a write pointer, and a read pointer, for sequentially storing at a location corresponding to said write pointer, consecutive messages received from said transmitting terrestrial portion and for sequentially transmitting messages from locations addressed by said address pointer, said transmitting means including a control input connected to said difference means;

said transmitting means transmitting a first control word having a first code indicating that messages are accumulating in said transmit memory and that an extra message will be transmitted to compensate for said accumulation, in response to said difference means indicating that said first bit timing cycle is relatively fast;

said transmitting means transmitting said first control word having a second code indicating that the number of messages in said transmit memory is depleting and that a message will be omitted in transmission to compensate for said depleting, in response to said difference means indicating that said first bit timing cycle is relatively slow;

means at said second ground station to receive said first control word and in response thereto, to anticipate the receipt of an extra message if said first control word has said first code and alternately to anticipate the omission of the receipt of a message if said first control word has said second code;

a framing character detector in said first ground station, connected to said transmitting terrestrial portion, for detecting the occurrence of a framing character delineating a message;

said difference means including an input connected to said write pointer and an input connected to said read pointer and having a second control input connected to said framing character detector, for outputting a second difference value between the address stored in said write pointer at the instant of occurrence of said first periodic signal and the address stored in said read pointer at the instant of occurrence of said universal clock pulse, said second difference value characterizing the relative position of said frame character with respect to said universal clock pulse;

said transmitting means transmitting a second control word characterizing said second difference value;

means at said second ground station for receiving said second control word and in response thereto, adjusting the position of said framing character with respect to said universal clock pulse;

whereby said messages at said receiving terrestrial portion are delineated by said framing characters and are synchronized with said first bit timing cycle.

* * * * *